United States Patent [19]

Karidis et al.

[11] Patent Number: 5,142,337
[45] Date of Patent: Aug. 25, 1992

[54] PRINTING GREY SCALE IMAGES

[75] Inventors: John P. Karidis, Ossining, N.Y.; Timothy C. Reiley, Los Gatos; Lawrence B. Schein, San Jose, both of Calif.

[73] Assignee: International Business Machines, Corp., Armonk, N.Y.

[21] Appl. No.: 594,513

[22] Filed: Oct. 9, 1990

[51] Int. Cl.$^5$ .......................................... G03G 15/06
[52] U.S. Cl. ................................. 355/266; 427/13; 355/326; 355/239; 430/120
[58] Field of Search .................. 355/328, 326, 77, 239, 355/266; 430/45, 97, 120; 427/13, 14.1, 27

[56] References Cited

U.S. PATENT DOCUMENTS

| | | | |
|---|---|---|---|
| 3,236,776 | 2/1966 | Tomanek et al. | 252/62.1 |
| 4,385,823 | 5/1983 | Kasper et al. | 355/239 |
| 4,845,524 | 7/1989 | Okamoto et al. | 355/239 |
| 4,855,204 | 8/1989 | Fujii et al. | 430/106 |

FOREIGN PATENT DOCUMENTS 59-23350  2/1984  Japan .
59-24857  2/1984  Japan .

OTHER PUBLICATIONS

Publication W. Lama, et al., in "Hybrid (Gray-Pixel) Halftone Printing", J. of Imaging Technology, vol. 15, No. 3, Jun. 1989.

*Primary Examiner*—R. L. Moses
*Attorney, Agent, or Firm*—Perman & Green

[57] ABSTRACT

An electrophotographic printing process enables a two-color printer having only binary printing capability to produce high-quality monochrome grey-scale output having, for example, up to 100 grey levels in a 3×3 super-pixel through the use of a second toner comprising a mixture of opaque black, opaque white, and clear toner. A layer of the second toner is applied so as to overlie the first toner layer on the substrate, the first toner comprising black toner. The composition of the second toner may be, for example, 9 percent opaque black toner, 9 percent opaque white toner, and 82 percent clear toner. Another embodiment extends this concept to the high-quality, enhanced grey-scale printing of a color other than black. In another embodiment, the layer of the second toner is comprised of a mixture of equal amounts of opaque black toner and opaque white toner and is applied so as to overlie the first toner layer on the substrate, the first toner layer comprised of black toner having a charge-to-mass ratio in the range of 2 to 10 times less than the second toner. This embodiment is also extended to high-quality, enhanced grey-scale printing of a color other than black. The use of these concepts is also extended to a full-color printer, in which each color is printed using enhanced grey-scale.

7 Claims, 1 Drawing Sheet

PRINTING GREY SCALE IMAGES

BACKGROUND OF THE INVENTION

1. Field of the Invention

The present invention relates generally to electrophotographic printing and, more particularly, to a method of printing grey-scale images with a two-stage electrophotographic printer and to a novel toner for use with the method. Furthermore, the invention allows the conversion of a conventional two-color printer to a monochrome printer having extended grey-scale capabilities. Furthermore, the invention may be applied to a full-color, high-quality EP printer with extended greyscale.

2. Description of the Prior Art

In recent years, electrophotographic (also called xerographic) printers have come to dominate the printer market. In a typical process, a photoconductive material is coated onto a drum or a belt, constituting a photoconductor. This photoconductor is provided with a uniform electrostatic charge in the absence of light. Then the coating is exposed to light by scanning a laser across the surface which imagewise discharges the uniform electrostatic charge, forming a latent electrostatic image which corresponds to the information to be printed. Similarly, the photoconductor may be exposed by other light sources such as light-emitting diodes.

The image is developed by being briefly contacted with a resin powder, called toner, whereupon a visible toner image is formed on the photoconductor, and said toner is then transferred to paper. The toner image is fixed to the paper by heating or by the action of solvents. In this way, an image which is resistant to abrasion, is obtained electrophotographically on plain paper.

The latent electrostatic image is contacted by toner in a development system. Development systems have been described which use one powder (toner), called monocomponent development systems, or which use two powders (toner and carrier), called magnetic brush development systems. In the magnetic brush development systems the carrier may be in the form of grains of polymer-coated or uncoated iron particles. The magnetic properties of the carrier particles are used to transport the carrier and toner particles to the electrostatic image. In the monocomponent systems the toner is transported to the electrostatic image either using magnetic forces (if magnetic material is incorporated within the toner) or using electrostatic forces (the toner's electrostatic adhesion to a roller). The material used for the toner may be a resin powder containing dyestuffs or pigments, e.g., carbon black. For both development system approaches the toner is charged by frictional electrification, either by contact against the carrier in the magnetic brush system or against a roller in the monocomponent system. When the toner is brought into contact with the electrostatic image, the charged toner particles are attracted by the electric field of the electrostatic image being developed.

Unfortunately, many electrophotographic printers do not render faithful or pleasing copies of continuous tone originals. The usual discharge characteristic of the photoconductive material and developability of the electrophotographic development system combine to yield a tone reproduction curve with a steep slope and few levels of darkness intermediate black and white. The result is a copy with washed out highlights and over-developed shadows. A standard technique used to improve the grey scale reproduction is to expose the photoconductor through a transmissive screen to produce a fine, spatially modulated voltage pattern on the photoconductive material. Development of this modulated pattern yields a tone reproduction curve with a lower slope and an extended range in the output. The result is a more faithful and pleasing copy.

A similar effect is found in the halftoning process employed in digital printing of pictures. The digital image is formed of a textured pattern of black and white spots, or pixels, which gives the impression of a grey when viewed at normal reading distance. If the halftone frequency and number of distinguishable grey steps are both sufficiently high, the printed picture will be pleasing to the eye. Digital halftone methods are often employed in binary electrophotographic printers. This is exemplified by laser printers with only two laser intensity levels: on and off. Since these digital printers produce individual black or white pixels, the opportunity exists to group the pixels into a halftone pattern to effectively produce spatially uninterrupted gradations of grey tones.

Groupings of pixels are commonly discussed in the literature of digital halftoning. Pixels can be grouped randomly (called dithering with white noise) or regularly. In regular arrays they can be grouped in clustered dots or dispersed dots. A well known grouping is called supercircle, where the dots are grouped regularly to form clusters in the form of ever-increasing larger circles as the grey level gets blacker.

A disclosure specific to electrophotography is U.S. Pat. No. 4,845,524 to Okamoto et al. This patent describes a two-step electrophotograhic process in which a black toner is used for a first step of transferring the image of an original document onto a white copy sheet. Thereafter, a white toner is used for a second step of superimposing a halftone solid onto a specified region of the image formed in the first step. The composition of a typical white toner said to have enhanced qualities is disclosed in U.S. Pat. No. 4,855,204 to Fujii et al. W. Lama, et al, in "Hybrid (Gray-Pixel) Halftone Printing", *J. of Imaging Technology*, Vol. 15, No. 3, June 1989 suggest that a significant improvement in pictorial quality can be achieved through a hybrid halftone technique where the pixels can have more than two levels (on-off). For instance, according to their concept, a trinary printer (black, white and one grey pixel level) can produce a vastly greater number of output grey steps than a binary printer. In a four-level printer having two intermediate grey pixel levels, the output steps can approach a continuum as viewed by the human eye. While the authors of the paper discuss the use of intermediate grey pixel levels, they do not disclose any method for physically achieving them, however.

It was in light of the foregoing that the invention has been conceived and is now reduced to practice.

SUMMARY OF THE INVENTION

An electrophotographic printing process enables a two-color printer having only binary printing capability to produce high-quality monochrome grey-scale output having, for example, up to 100 grey levels in a 3×3 super-pixel through the use of a second toner. This second toner would, for a black and white printer, be comprised of a mixture of opaque black, opaque white, and clear toner. A layer of the second toner is applied so as to overlie a layer of first toner composed of opaque black toner, or so as to overlie the untoned printing substrate, e.g., paper. This allows two grey levels at a given pixel which are intermediate the extreme black and white levels. The composition of the second toner may be, for example, 9 percent opaque black toner, 9 percent opaque white toner, and 82 percent clear toner. In another embodiment, both first and second toners may be colored, such that the first toner is comprised of a single colored toner and the second is comprised of a mixture of the same color toner, plus white toner and clear toner. The ratio may be as given above (9, 9, 82 relative percents) or, alternately, be adjusted for a given color, such as cyan, magenta or yellow.

In another embodiment for black and white printing, the layer of the second toner is composed of a mixture of roughly equal amounts of an opaque black toner and opaque white toner and is applied so as to overlie a layer of the first toner or the printing substrate, the second toner having a charge to mass ratio which is 5 to 10 times that of the first toner, but which is developed onto an electrostatic image (on the photoconductor) which is formed in the same manner as the first image, to which the first toner was applied. The effect of the increased charge is to allow less of the toner mixture to be applied under a given development condition, thereby eliminating the need for the clear toner used in the toner mixture described above. The same technique of using a more highly charged second toner mixture applies to color grey-scale printing. For both black and white and for color, two intermediate grey levels are produced using two toner mixtures.

It will be appreciated that throughout this disclosure, black toner may be replaced by toner of a color other than black and that white toner may be replaced by toner of a color other than white.

Other and further features, advantages, and benefits of the invention will become apparent in the following description taken in conjunction with the following drawings. It is to be understood that the foregoing general description and the following detailed description are exemplary and explanatory but are not to be restrictive of the invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 1A:
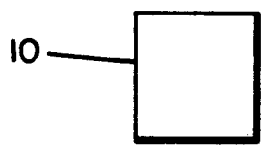
FIG. 1A diagrammatically depicts a typical blank, or white, pixel which is square in shape.
Figure 1B:
FIG. 1B diagrammatically depicts a typical black pixel.
Figure 1C:
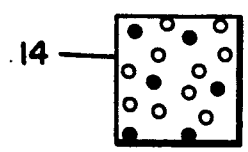
FIG. 1C diagrammatically depicts a pixel such as that depicted in FIG. 1A which has been modified in accordance with the invention.
Figure 1D:
FIG. 1D diagrammatically depicts a pixel such as that depicted in FIG. 1B which has also been modified in accordance with the invention.

Turn now, initially, to FIGS. 1A, 1B, 1C, and 1D which depict, diagrammatically, a variety of pixels, or picture elements, which individually represent the smallest area on the substrate on which the presence or absence of toner may be specified. The toner is developed onto the photoconductor, then transferred to the pixels on the substrate, e.g., paper. FIG. 1A represents a typical blank, or white, pixel 10 which is idealized as square in shape, although the printed pixel is normally more round or elliptical. FIG. 1B represents a typical black pixel 12, on which black toner has been printed. FIGS. 1C and 1D represent modified pixels 14 and 16, respectively. These modified pixels are of "salt-and-pepper" composition resulting from operation of a printer according to the teachings of the invention, as will be described.

Figure 2:
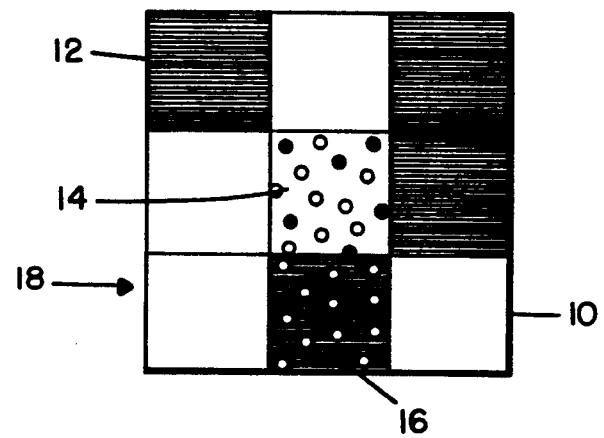
FIG. 2 diagrammatically depicts a super-pixel composed of nine pixels which are, variously, of the form depicted in FIGS. 1A, 1B, 1C, and 1D.
Figure 3:
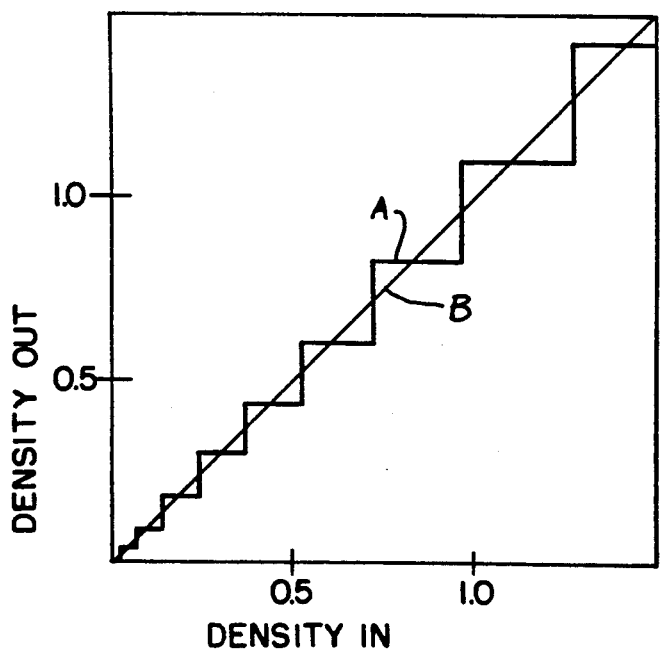
FIG. 3 is a graph depicting the output density of a typical binary printer with a 3-by-3 superpixel as a function of the desired, or input, density (Curve A). Note the nine distinct grey level steps. Also shown is a schematic representation of the output density versus input density that can be achieved using the approach of providing two optimum intermediate grey levels at each pixel. Curve B, which actually would contain approximately one hundred small steps, approaches the ideal straight line which is desired for good toner reproduction.

In binary printing operations, it is common practice to combine a small number of pixels to form cells or super-pixels. By controlling the number of black and white pixels within a super-pixel, it has been possible to achieve graduations of grey tones between black and white, although the result achieved has not been completely pleasing to the human eye. A super-pixel 18 modified in accordance with the present invention is depicted in FIG. 2.

It has come to be recognized that a large number of grey levels can be generated in a relatively small super-pixel if a very small number of optimally chosen densities are available at each pixel location. A pixel is usually a small fraction of an inch in each direction; a conventional size is 1/300th of an inch by 1/300th of an inch. A super-pixel may be composed of a number of pixels; for example, a 3×3 super-pixel 18 as illustrated in FIG. 2 may be composed of 9 pixels. In this context, if relative absorptions of 0, 1/11, 10/11, and 11/11 of maximum absorption can be produced in a 3×3 super-pixel, then 100 distinct and uniformly spaced absorbtion grey levels can be generated in the super-pixel. This can easily be understood by the analogous situation of being able to place anywhere from 0 to 99 cents in coins in 1-cent increments on a 3×3 array if each array cell can contain either nothing, 1 penny, 1 dime, or one penny and one dime. Unfortunately, however, this method is difficult to implement in a practical printer because of the quite irreproducible process of depositing a very small amount of toner, as would be necessary for the 1/11 relative absorption pixel. This causes large fluctuations in the continuity and number of grey scale levels. Furthermore, the process of incrementing the amount of toner from 10/11ths to 11/11ths absorption is also quite variable because of natural fluctuations in the development process. This mode of grey-scale generation using a single developer is technically not viable for the scheme outlined above.

At this time, it appears that two-color printers which print black plus an accent color may become popular as the industry moves slowly towards full color printing. This disclosure presents a method for utilizing such a "two-color" printer to generate high quality black-and-white grey scale images by using a "salt-and-pepper"

toner mixture as the accent "color". Furthermore, this concept can be applied to high-quality color printing, in which the "salt-and-pepper" technique is applied to each of the four colors: cyan, magenta, yellow and black. For each, two developers and toners would be used.

Consider the case described above where a 3×3 super-pixel is to be used to generate a black-and-white grey level image. If only black toner is used, only 10 grey levels (including zero) can be generated. If, however, the optimal levels of 1/11 and 10/11 of maximum absorption can be generated at each pixel in addition to the blank and maximum density cases, then up to 100 levels are possible. The use of a mixture of black, white, and clear toner as the second color can provide these intermediate levels accurately and with few changes to the printer as follows. If a toner mixture of 9 percent (that is approximately 1/11) opaque black toner, 9 percent opaque white toner, and 82 percent clear toner is developed on a blank sheet of white paper, the clear toner and the white toner will be largely invisible.

Note that this condition requires that the fusing step be carried out so as to allow transparency of the overlying clear toner. The black toner, which covers approximately 9 percent of the pixel area as a result of the toner mixture ratio, will then produce an absorption level of roughly 1/11 of the maximum absorption of a black pixel. If that same toner mixture is developed so as to be on top of a black pixel on the final printed substrate, however, the clear and the black toner in the second layer will have no significant effect on the absorption of the underlying black layer while the opaque white fraction of the second toner layer will cover the black toner under it and effectively create approximately 9 percent white area in the otherwise black pixel, thus generating the desired 10/11 maximum pixel absorption.

If the two-color image is built up on the paper, then the accent color is deposited in the second printing step after the solid black toner, whereas if the two-color image is first formed on the photoconductor or other intermediate surface and then transferred to paper, then the accent color is printed in the first step in order to end up on top of the final printed image. For a two developer system where the image is accumulated on the photoconductor, and where the first pass developer is unspecified, the second developer must be a non-contaminating developer, such as a jump developer. Alternatively, where the two-toned image is not accumulated on the photoconductor but is transferred one image at a time to an intermediate surface (before being transferred to paper), then, in this case, both developers may be of the standard sort.

In this manner, the four combinations possible from binary printing of the regular toner and/or the salt-and-pepper toner mixture at each pixel results in the four absorption levels desired (0, 1/11, 10/11, and 11/11 times the maximum absorption), as shown schematically in FIG. 1. The advantage of this approach arises from the fact that only full pixel development is used and the precise absorptions of the intermediate grey levels can be controlled simply by controlling the distribution of black and white toner in the secondary toner mixture. In fact, the precise toner distribution is determined experimentally in practice so that numerous hard-to-simulate effects such as dot overlap and toner spreading are eliminated and the desired intermediate absorption ratios are achieved. The same procedure is applicable to a monochrome system having a color different than black.

It should be obvious that this approach can also be used to generate the optimal absorption levels necessary with other super-pixel sizes. In general, the intermediate levels required for a scheme with four possible levels at each pixel are $1/(NM+1)$ and $(NM)/(NM+1)$ times the maximum absorption, where N and M are the pixel dimensions of the super-pixel. These levels could generally be achieved with a mixture of $1/(NM+1)$ black toner, $1/(NM+1)$ white toner, with a balance of clear toner. Details of the black and white toner absorptions, dot overlap, and toner spreading will all have some effect on the net absorption, however, so the exact ratios should be determined experimentally, if possible.

Furthermore, it should be clear that the secondary toner mixture could also be adjusted so as to yield other intermediate absorptions between plain paper and black toner, such as those proposed by W. Lama et al in their paper as mentioned above. (In contrast, the optimum grey levels discussed earlier in this disclosure provide output levels which are linear in absorption). In any case, though, the disclosed approach can be used to generate, easily and accurately, any two intermediate levels desired, since the proportion of black toner alone determines the absorption of the lower intermediate grey level while the proportion of white toner independently controls the absorption of the darker intermediate level when printed on top of a normal black pixel.

In a second embodiment of this disclosure, the secondary toner mixture could be formulated with a higher charge than the underlying toner. If, for example, the secondary toner mixture contains roughly 50 percent white and 50 percent black toner but has a charge-to-mass ratio that is, for example, five times higher than the normal black toner, then only a fraction of the amount of toner developed in the first step would be developed with the second "salt-and-pepper" toner. Intermediate levels of approximately 1/10 black and 1/10 white would be preserved when printing over a white or black pixel, respectively. For example, if the underlying toner is charged to an average value of 5 micro C/g and the secondary toner is charged to an average of 25 micro C/g, the amount of toner delivered to a given solid area or line will be substantially different. If the latent image is established for each development step in the same way, then the higher charged toner will be deposited to a lesser degree than the lower charged toner. Note that the required difference in the level of charge-to-mass ratio between the two toners will be dependent on the developer systems used for both development steps. This does, however, provide a degree of freedom which lessens the optical density difference requirements between the two toners and allows more toner to be deposited in the low optical density state. It is expected that having the extra degree of freedom in relative charge-to-mass ratio will improve the convenience in establishing this "darkness" element of grey scale.

It will be understood, however, that this is an oversimplification of the development process and that the actual charge-to-mass ratio necessary for the desired partial development must be determined experimentally. This second approach has the advantage of using less toner and of not requiring the clear toner, while the first approach has the advantage of using the same toner charge-to-mass ratio, which may allow the toner formation and developer hardware to be more similar to the normal black toner than a high-charge toner.

In summary, the present invention allows a two-color printer having only binary printing capability to produce high quality monochrome grey-scale output having, for example, up to 100 grey levels in a 3×3 super-pixel through the use of a second toner comprising a mixture of black, opaque white, and optionally, clear toner. The method provides the flexibility to adjust independently the two intermediate grey levels to optimum values (which depend on the optimization objective), and thereby to produce the maximum number of evenly distributed average grey levels possible in a given super-pixel size while not requiring extremely tight control of the electrophotographic process parameters.

While preferred embodiments of the invention have been disclosed in detail, it should be understood by those skilled in the art that various other modifications may be made to the disclosed concepts without departing from the scope of the invention as described in the specification and defined in the appended claims.

What is claimed is:

1. An electrophotographic printing process comprising the steps of:
   (a) applying a first layer of first toner material composed of either opaque black toner or opaque white toner onto a defined region of a receiving surface; and
   (b) thereafter applying a second layer of second toner material composed of a mixture of at least one of opaque black toner, opaque white toner, and clear toner onto the defined region so as to overlie said first layer of the first toner material.

2. An electrophotographic printing process as set forth in claim 1
   wherein the composition of the second toner material is approximately 9 percent opaque black toner, 9 percent opaque white toner, and 82 percent clear toner.

3. An electrophotographic printing process as set forth in claim 1
   wherein the receiving surface is an intermediate surface; and
   wherein the sequence of steps (a) and (b) is reversed; and
   including the step of:
   (c) transferring the combined layers of first and second toner material to a final surface;
   whereby, on the final surface, the layer of the second toner material overlies the layer of the first toner material.

4. An electrophotographic printing process as set forth in claim 3
   wherein black toner may be replaced by toner of a color other than black; and
   wherein white toner may be replaced by toner of a color other than white.

5. An electrophotographic printing process as in claim 1
   wherein steps (a) and (b) are repeated at least one more time; and
   wherein the black toner in repeated steps (a) and (b) is of a color other than black and other than that of any of the preceding repeated steps.

6. An electrophotographic printing process comprising the steps of:
   (a) applying a layer of first toner material composed of either opaque black toner or opaque white toner onto a defined region of a receiving surface;
   (b) imparting an electrical charge to the first toner material having a first predetermined charge to mass ratio; and
   (c) thereafter applying a layer of second toner material composed of a mixture of approximately equal amounts of opaque black toner and opaque white toner onto the defined region so as to overlie the layer of the first toner material by imparting an electrical charge thereto having a second predetermined charge to mass ratio which is substantially higher than the first predetermined charge.

7. An electrophotographic printing process as set forth in claim 6
   wherein the second predetermined charge to mass ratio is in the range of 2 to 10 times higher than the first predetermined charge.

* * * * *